(12) United States Patent
Mager et al.

(10) Patent No.: US 11,306,422 B2
(45) Date of Patent: Apr. 19, 2022

(54) METHOD FOR MAKING A FIBER FLEECE

(71) Applicant: Reifenhaeuser GmbH & Co. KG Maschinenfabrik, Troisdorf (DE)

(72) Inventors: Jens Mager, Cologne (DE); Andreas Roesner, Bonn (DE); Christian Stelter, Ingelheim (DE); Asmir Vodencarevic, Erlangen (BA); Thomas Fett, Troisdorf (DE); Mark Hilgers, Troisdorf (DE); Christoph Lettowsky, Aachen (DE)

(73) Assignee: REIFENHAEUSER GMBH & CO KG MASCHINENFABRIK, Troisdorf (DE)

( * ) Notice: Subject to any disclaimer, the term of this patent is extended or adjusted under 35 U.S.C. 154(b) by 370 days.

(21) Appl. No.: 15/784,636

(22) Filed: Oct. 16, 2017

(65) Prior Publication Data
US 2018/0105956 A1   Apr. 19, 2018

(30) Foreign Application Priority Data
Oct. 18, 2016   (DE) .......................... 102016119866.8

(51) Int. Cl.
*D04H 3/02* (2006.01)
*B29C 48/92* (2019.01)
(Continued)

(52) U.S. Cl.
CPC ............. *D04H 3/02* (2013.01); *B29C 43/245* (2013.01); *B29C 48/05* (2019.02); *B29C 48/69* (2019.02); *B29C 48/92* (2019.02); *B29C 69/02* (2013.01); *B29D 99/0078* (2013.01); *D01D 4/02* (2013.01); *D01D 5/088* (2013.01); *D01D 5/0985* (2013.01); *D01D 5/12* (2013.01); *D01D 7/00* (2013.01); *D01D 11/00* (2013.01); *D04H 3/005* (2013.01); *B29C 2948/92409* (2019.02); *B29C 2948/92428* (2019.02); *B29C 2948/92438* (2019.02);
(Continued)

(58) Field of Classification Search
CPC ....................................... D01D 5/14
See application file for complete search history.

(56) References Cited

U.S. PATENT DOCUMENTS 4,692,106 A * 9/1987 Grabowski .............. D01D 5/14
264/211.14
4,797,079 A * 1/1989 Balk ........................ D01D 1/09
264/176.1
(Continued)

FOREIGN PATENT DOCUMENTS

DE   4014414 C2 * 8/1996 ............. D04H 3/005
EP   2738297 A1 * 6/2014 ............. D04H 3/005

*Primary Examiner* — Benjamin A Schiffman
(74) *Attorney, Agent, or Firm* — Andrew Wilford

(57) ABSTRACT

A system for making a nonwoven nonwoven spun-bond or melt-blown fabric has a spinneret for spinning fibers or filaments, a cooler downstream of the spinneret for cooling the spun fibers or filaments, a stretcher downstream of the cooler for stretching the cooled fibers or filaments, and a conveyor downstream of the stretcher. The stretched and cooled fibers or filaments are deposited as a nonwoven web on the conveyor. Sensors measure input parameters at the spinneret, at the cooler, at the stretcher, and/or at at least one diffuser or at the conveyor. An evaluating unit for determining an output parameter from the measured input parameter with respect to a predetermined reference parameter.

11 Claims, 3 Drawing Sheets

(51) Int. Cl.

| | | |
|---|---|---|
| *D01D 11/00* | (2006.01) |
| *D01D 4/02* | (2006.01) |
| *D01D 5/12* | (2006.01) |
| *D01D 5/088* | (2006.01) |
| *B29C 43/24* | (2006.01) |
| *B29C 69/02* | (2006.01) |
| *D01D 7/00* | (2006.01) |
| *D01D 5/098* | (2006.01) |
| *B29C 48/69* | (2019.01) |
| *B29C 48/05* | (2019.01) |
| *B29D 99/00* | (2010.01) |
| *D04H 3/005* | (2012.01) |
| *B29K 101/12* | (2006.01) |
| *B29L 31/00* | (2006.01) |

(52) U.S. Cl.
CPC ............. *B29C 2948/92904* (2019.02); *B29C 2948/92923* (2019.02); *B29C 2948/92933* (2019.02); *B29K 2101/12* (2013.01); *B29L 2031/726* (2013.01)

(56) References Cited

U.S. PATENT DOCUMENTS

| | | | | |
|---|---|---|---|---|
| 4,812,112 A * | 3/1989 | Balk | ............. | D01G 25/00 425/66 |
| 4,820,142 A * | 4/1989 | Balk | ............. | D04H 3/02 348/97 |
| 4,875,846 A * | 10/1989 | Reinbold | ............. | D01D 1/06 425/186 |
| 5,236,641 A * | 8/1993 | Allen | ............. | B05C 11/1044 264/40.1 |
| 5,469,149 A * | 11/1995 | Binner | ............. | B29C 48/30 340/677 |
| 5,487,655 A * | 1/1996 | Frey | ............. | D01D 5/0985 425/140 |
| 5,599,488 A * | 2/1997 | Prof e | ............. | D01D 5/0985 264/40.3 |
| 5,728,407 A * | 3/1998 | Matsui | ............. | D01D 4/025 425/7 |
| 2006/0040008 A1* | 2/2006 | Geus | ............. | D01D 5/088 425/72.2 |
| 2009/0004313 A1* | 1/2009 | Geus | ............. | D04H 3/16 425/66 |
| 2009/0026647 A1* | 1/2009 | Geus | ............. | D01D 5/14 264/40.6 |
| 2011/0147977 A1* | 6/2011 | Sommer | ............. | D04H 3/005 264/115 |
| 2015/0299921 A1* | 10/2015 | Sommer | ............. | D01D 5/092 442/401 |
| 2016/0002825 A1* | 1/2016 | Cinquemani | ............. | D01D 5/088 264/210.8 |

\* cited by examiner

METHOD FOR MAKING A FIBER FLEECE

FIELD OF THE INVENTION

The invention relates to a method of making a nonwoven fabric from fibers in a nonwoven fabric-making system, particularly for making a spun-bond nonwoven fabric from continuous filaments or for making a melt-blown nonwoven fabric from continuous filaments. The invention further relates to a system for making a nonwoven fabric from fibers or continuous filaments. The manufacture of a nonwoven fabric, particularly of a spun-bond nonwoven fabric or melt-blown nonwoven fabric, from continuous filaments is especially preferred in the context of the invention.

BACKGROUND OF THE INVENTION

In such a method the fibers or filaments are spun by at least one spinneret, optionally cooled by at least one cooler downstream therefrom, then preferably stretched, and subsequently deposited onto a conveyor as a nonwoven web. Continuous filaments differ from staple fibers on account of their nearly endless length, whereas staple fibers have much shorter lengths of for example 10 mm to 60 mm.

Methods and systems of the type mentioned above are known from practice in various embodiments. In particular, various methods of making spun-bond nonwoven fabrics from continuous filaments are known in which the continuous filaments are spun by a spinning device or spinneret and subsequently cooled in at least one chamber of a cooler. Process air or cooling air from an air supply cabin is feed from opposing sides to the cooling chamber and/or to the filaments being fed through the cooling chamber. Blowers are provided to feed the process air or cooling air into the cooling chamber. It is also known to measure the air pressure in the air-supply compartment by at least one pressure sensor. This measured air pressure is used as a control variable for controlling the blower speeds with or without feedback. In the event of a malfunction of the pressure sensor or pressure sensors, operation of the system must normally be interrupted in order to avoid unpredictable faults.

It is also known that the filaments cooled in the cooling chamber subsequently pass into a stretcher, particularly into an intermediate passage or stretching passage of the stretcher. It is possible for filaments to become stuck in the intermediate passage or stretching passage. Since additional filaments continue to be fed from above, obstructions can occur. This, in turn, can have the effect that the airflow through the air-supply compartment is insufficient and the filaments are consequently not sufficiently cooled. This can cause the liquid plastic melt to back up, which can cause the air rectifiers of the air-supply compartment to be damaged. Such faults can result in manufacture being halted for up to two weeks. With current means for controlling the blowers, such a fault condition cannot be readily identified and prevented.

In the other system components of the known nonwoven fabric-making systems as well, fault conditions or anomalies are not always identified or are not always identified promptly, so that unwanted manufacture stoppages can occur. This is especially true in the event of the failure of measuring devices or sensors.

OBJECT OF THE INVENTION

In light of this, the object of invention is to provide a method of the type described above in which system parameters can be identified in a simple and relatively precise manner and in which simple, functionally reliable, and prompt identification of fault conditions or anomalies is possible. The invention also has the object of providing a corresponding nonwoven fabric-making system.

SUMMARY OF THE INVENTION

In order to attain these objects, the invention proposes a method of making a nonwoven fabric from fibers in a nonwoven fabric-making system, particularly for making a spun-bond nonwoven fabric from continuous filaments or for making a melt-blown nonwoven fabric from continuous filaments, with the fibers or filaments being spun by at least one spinneret, optionally cooled by at least one cooler downstream therefrom, then preferably stretched, and subsequently deposited onto a conveyor as a nonwoven web.

At least one reference parameter is generated, and at least two, preferably at least three input parameters that are different from the reference parameter are measured during ongoing operation of the system by sensors, and an output parameter corresponding to the reference parameter is identified from these measured input parameters by at least one evaluating unit. It lies within the scope of the invention that the identified output parameter is compared with the reference parameter. According to an especially preferred embodiment of the invention, in the event of a deviation of at least one identified value of the output parameter from the at least one value or measured value of the reference parameter, an anomaly of the output parameter is signaled. The signaling is performed particularly through a visual and/or acoustic signal. According to a very preferred embodiment, the deviation or anomaly is documented, particularly in that it is stored in a memory or in an independent storage. This can be a database, the cloud, or similar storage. Later analyses and/or correlations are facilitated by the preferred documentation and storage. On detection or signaling of the above-mentioned deviation or anomaly, the following reactions are possible in principle: The entire system is shut down and/or individual system components are shut down and/or, in the case of system components that can be adjusted, the system components are adjusted, particularly in such a way that influence can be exerted on the measured input parameters and thus to the output parameter determined therefrom. The individual system components are thus controlled without feedback or as a function of the detected deviation or anomaly. For instance, the blower speed of a blower and/or the temperature of a temperature controller and/or the flow cross section of an opening or gas passage opening can be controlled with or without feedback in dependence on the identification of a deviation or anomaly. The above-described anomaly in the output parameter can also be attributable to input parameters that result from measurements with malfunctioning or recalibrated measuring devices or sensors.

In the context of the invention, the term "parameter" (particularly "reference parameter," "input parameter," "output parameter") stands for a measured variable or physical measured quantity such as for example the pressure, the temperature, the volumetric flow rate, the speed, or the flow cross section of a gas passage opening. In the context of the invention, "measured value" refers to the value of this parameter or of this variable or quantity that is measured. In terms of the invention, if an output parameter corresponds to the reference parameter, this means that output parameter and reference parameter concern the same measured variable or physical measured quantity, such as for example pressure.

According to an especially preferred embodiment of the invention, the at least one reference parameter or the reference parameter is measured with a respective sensor during reference operation of the nonwoven fabric-making system. "Reference operation of the nonwoven fabric-making system" refers particularly to the trouble-free, normal operation of the system. A reference parameter that is measured in this state, for example air pressure, is then compared in the context of the method according to the invention with the corresponding identified or calculated output parameter (detected air pressure). According to a recommended embodiment, the measuring of the reference parameter during reference operation of the nonwoven fabric-making system is performed as an in-line measurement during the continuous reference operation of the system. According to another embodiment, however, the measurement of the reference parameter using the reference sensor can also be performed off-line. Such off-line measurement of the reference parameter is for example advantageous if the reference parameter is a single layer thickness in a laminate, a tensile strength, or the like. According to another embodiment of the invention, the reference parameter or at least one reference parameter can be predefined as an empirical parameter. This means that, in the context of the method according to the invention, the reference parameter need not necessarily be measured, but rather at least one value or a value already exists for the reference parameter in the form of an empirical parameter or empirical value. This empirical parameter or empirical value can originate from previous measurements or be the result of investigations or calculations.

It lies within the scope of the invention for at least two different input parameters to be measured by sensors and for an output parameter to be determined from these measured input parameters using an evaluating unit. It is thus possible, in particular, to measure input parameters such as temperature, volumetric flow rate, blower speed, and the like using sensors and to determine at least one output parameter, such as for example pressure or air pressure therefrom using the evaluating unit. In principle, however, it is also possible in the context of the invention for at least one input parameter to be predefined as a fixed or constant system parameter and used to determine the output parameter. This predetermined set system parameter or input parameter can be a geometric quantity, for example, such as a fixed flow cross section, a fixed cross-sectional area, or the like. Nevertheless, in the context of the method according to the invention, at least two input parameters, preferably at least three input parameters are measured (as input parameters with variable measured values). The output parameter is then determined from the at least one predefined input parameter and the other measured input parameters. In the event of a deviation of the value of the output parameter determined in this way from the value/measured value of the reference parameter, the anomaly of the output parameter is signaled and, as already described above, influence can be exerted on the system and/or system components or on the controlling of the system and/or system components.

According to one embodiment of the invention, the at least one reference parameter or the reference value of the reference parameter can also be calculated, optionally on the basis of other known parameters. Such a calculation of the reference parameter is advantageous if the measurement of the reference parameter by a reference sensor is either not or not readily possible. It also lies within the scope of the invention for at least one input parameter to be calculated. Here, too, the calculation of at least one input parameter is sensible if it is either not or not readily possible to measure the input parameter. The respective input parameter is then calculated on the basis of known parameters or state parameters. This calculated input parameter is then advantageously used in determining the output parameter. According to one embodiment of the invention, the output parameter can then be determined from the measured input parameters, optionally from the at least one fixed, predefined input parameters and possibly also from at least one calculated input parameter. If the output parameter deviates from the reference parameter, then the procedure described above can be repeated.

It lies within the scope of the invention for the fibers or filaments to be made of thermoplastic plastic and for the plastic or plastic melt to be fed to the spinneret by at least one extruder. If multicomponent fibers or multicomponent filaments are to be manufactured, two or more extruders are used to feed the plastic melt. Advantageously, the plastic or molten plastic emerging from an extruder is fed to the spinneret by a melt pump. According to one embodiment of the invention, the at least one reference parameter or output parameter is at least one parameter from the group comprised of: material density, bulk density, dosage amount, melt density, feed rate, and melt leakage of the plastic that is being used. The input parameters to be used and/or measured for the determination of the corresponding output parameter are then preferably parameters from the group comprised of: melt pressure, extruder temperature, extruder speed, extruder torque, pump speed, and melt temperature. In the context of the invention, "raw material density" refers to the density of the plastic used for the plastic or plastics used to produce the fibers. In the context of the invention, "bulk density" refers to the density of the plastic or plastic granulate used in the system according to the invention, particularly in a hopper upstream of the extruder. In the context of the invention, "dosage amount" refers to the quantity of plastic fed to the extruder. Moreover, in the context of the invention, "melt density" refers particularly to the density of the plastic melt fed to the spinneret, and "feed rate" refers particularly to the quantity of plastic melt fed to the spinneret. "Melt pressure" and "extruder temperature" refer particularly to the melt pressure measured in the extruder and to the temperature measured in the extruder, respectively. "Extruder speed" and "extruder torque" concern the speed and torque of the extruder screw. What is meant by "pump speed" is particularly the speed of the melt pump that is preferably used.

One embodiment of the invention is characterized in that the raw material density (of the plastic or plastics) is used as a starting parameter or reference parameter. This enables the possible use of an incorrect or switched raw material to be detected early on. The early detection of raw material-related manufacture problems due to user errors and/or warehouse errors and/or batch fluctuations and the processing problems resulting therefrom is thus possible.

It lies within the scope of the invention for the molten plastic to be fed through at least one cleaning screen in the travel direction upstream of the spinneret and preferably by the melt pump. In this case, the input parameters can be (also) selected from the group comprised of: melt pressure upstream of the cleaning screen, melt pressure downstream of the cleaning screen, hours of operation of the cleaning screen. The hours of operation of the cleaning screen can be a predetermined set input parameter, and thus an input parameter that does not need to be measured at present.

One very recommended embodiment of the method according to the invention that has special significance in the context of the invention is characterized in that the nonwoven fabric is a spun-bond nonwoven fabric from continuous filaments, that these continuous filaments are spun by at least one spinneret, that the spun filaments are cooled in at least one cooling chamber of the cooler, that process air and/or cooling air can be blown by a blower into the cooling chamber that is composed of at least one air-supply compartment, and that the filaments are stretched and, downstream therefrom, deposited onto a conveyor, particularly onto a mesh conveyor belt. It lies within the scope of the invention for monomer extraction to be performed between the spinning device or spinneret and the cooling chamber. It is advantageous for a monomer extractor to be provided for this purpose between the spinneret and the cooling chamber or air-supply compartment. This monomer extractor extracts air from the filament-forming region beneath the spinneret, so that the gases such as monomers, oligomers, decomposition products, and the like that emerge in addition to the continuous filaments are removed from the system. It is recommended that the monomer extractor have at least one extraction chamber to which at least one exhaust blower is preferably connected. Preferably, the extraction chamber has at least one extraction gap open toward the filament-forming region. It lies within the scope of the invention for at least one extraction gap for the monomer extraction to be provided on each of the two opposing sides of the filament-forming region. Preferably, a stretcher is downstream from the cooling chamber for elongating the continuous filaments. One recommended embodiment of the invention is characterized in that at least one diffuser is between stretcher and conveyor through which the filaments are fed and, downstream of the diffuser, are then deposited onto the conveyor.

One very especially preferred embodiment of the invention is characterized in that the reference parameter or output parameter is the compartment pressure of the air-supply compartment of the cooling chamber. The output parameter "compartment pressure" is preferably determined from initial parameters from the group comprised of: temperature, monomer volumetric flow rate, process air temperature, blower speed, outlet gap width of the stretching passage, positions of the diffuser walls. "Melt temperature" refers particularly to the temperature of the plastic melt at the nozzle of the spinneret or spinneret. What is meant by "monomer volumetric flow rate" is particularly the volumetric flow rate of the extracted gases occurring at the monomer extractor. According to one variant of the invention, the monomer volumetric flow rate can be determined on the basis of the flow cross section of the extraction gap and/or of the extraction gaps of the monomer extractor and/or on the blower speed of an exhaust fan of the monomer extractor. As regards the flow cross section of the monomer extractor, the position of a closure element, particularly of a closure cap for the extraction gap or extraction gaps of the monomer extractor can be measured/determined and used for the calculation of the monomer volumetric flow rate. "Process air temperature" refers particularly to the temperature of the process air or cooling air fed from the air-supply compartment. According to an especially recommended embodiment of the invention, at least two process air streams of different temperatures $T_a$ and $T_b$ are introduced into the cooling chamber. The two different process air temperatures $T_a$ and $T_b$ are thus input parameters to be measured and used for the determination of the output parameter. According to a preferred design variant, the above-described blower speed refers to the speed of a blower in the air-supply compartment and provided for feeding in process air. In the context of the method according to the invention, at least two and/or two independently operated blowers are used in the air-supply compartment in order to feed in the process air. Advantageously, the two blowers are each used to introduce process air and/or cooling air of a different temperature $T_a$ or $T_b$ into the cooling chamber. Each of these blowers of the air-supply compartment has a separate speed, and each blower speed $n_a$ or $n_b$ preferably constitutes an input parameter to be determined and/or measured. In principle, the torque of a blower or the two blower torques of the two blowers could also be used as input parameters. It follows from the above explanations that at least four input parameters to be measured are preferably available for the two blowers of the air-supply compartment, preferably the two process air temperatures $T_a$ and $T_b$ and the two blower speeds $n_a$ and $n_b$.

It was already pointed out above that, according to a very preferred embodiment, the compartment pressure of the air-supply compartment is a reference parameter and output parameter. In that case, the compartment pressure is advantageously measured first as a reference parameter during reference operation (trouble-free normal operation) of the nonwoven fabric-making system. This measured pressure value or these measured pressure values of the reference parameter is/are thus used as comparative values for the compartment pressure detected during ongoing operation of the system as an output parameter. The compartment pressure as an output parameter during ongoing operation of the system is determined by the at least one evaluating unit particularly on the basis of the input parameters comprised of: the melt temperature, monomer volumetric flow rate, process air temperature, blower speed, outlet gap width of the stretching passage, and positions of the diffuser walls. Advantageously, at least two blower speeds from two separately operated blowers of the air-supply compartment are used. While melt temperature, monomer volumetric flow rate, process air temperature, and blower speed represent input parameters that are for example measured during ongoing operation, the outlet gap width of the stretching passage and/or the position of the diffuser walls can be predefined system parameters as input parameters. In principle, however, the input parameters of outlet gap width of the stretching passage and/or position of the diffuser walls can also be measured during ongoing operation. It lies within the scope of the invention for the outlet gap width of the stretching passage and/or the position of the diffuser walls to be changeable and/or adjustable during ongoing operation.

Preferably, the compartment pressure is determined as an output parameter on the basis of at least six, preferably at least seven, and more preferably on the basis of at least eight input parameters. According to an especially preferred embodiment of the invention, the compartment pressure is determined as an output parameter on the basis of nine input parameters. These are preferably the nine input parameters: melt temperature $T_s$, monomer volumetric flow rate $V_M$, first blower speed $n_a$, second blower speed $n_b$, first process air temperature $T_a$, second process air temperature $T_b$, outlet gap width $a_w$, of the stretching passage, positions $d_a$ and $d_b$ of the diffuser walls. Alternatively or in addition, it is also possible in principle for the blower torques to be included in the determination or calculation of the output parameter. If the compartment pressure determined as an output parameter in the manner described above differs from the compartment pressure used as the reference parameter, an anomaly or fault condition is signaled. As a function of the displaying of such a deviation or anomaly, the entire system can then be shut off and/or individual system components can be shut off and the adjustment of adjustable system components is controlled with or without feedback.

The inventive comparison of the values of output parameter and reference parameter can also apply to the area of the conveyor of the system according to the invention. In this connection, the invention teaches in particular that the nonwoven web deposited on the conveyor is compacted, particularly by at least one calender. Such a calender advantageously has two reciprocating calender rolls, with the nonwoven web being fed through the gap between the calender rolls. It lies within the scope of the invention for at least one of these calender rolls to be heated. In this context, the at least one reference parameter or output parameter is preferably selected from the group comprised of: the nonwoven web in the machine direction (MD), firmness of the nonwoven web transverse to the machine direction (CD), stretchability of the nonwoven web in the machine direction (MD), stretchability of the nonwoven web transverse to the machine direction (CD), and nonwoven web thickness. Advantageously, the input parameters that are then measured or predefined for determining the output parameter come from the group comprised of: process air pressure, process air temperature, process air volumetric flow rate, speed of at least one calender roll, calender temperature of at least one calender roll, calender engraving, speed of the mesh conveyor belt, and melt flow index (MFI) of the plastic used for the fibers or filaments. The calender engraving or type of calender engraving is advantageously an input parameter that is predefined as a system parameter, whereas the other input parameters that are used for the evaluation are preferably measured by sensors.

According to a preferred embodiment of the invention, the conveyor for delivering the nonwoven web is a mesh conveyor belt, it being recommended that the mesh conveyor belt be operated and/or moved as a continuous belt. Such mesh conveyor belts are subjected to a certain amount of wear and attrition during operation. Furthermore, the mesh conveyor belt has a plurality of mesh openings that can become clogged by contaminants or the like, for example from monomers occurring during spinning. The wear and attrition of the screen belt can also be detected with the aid of input parameters. In this context, one preferred embodiment of the method according to the invention is characterized in that the conveyor is a mesh conveyor belt, that at least one reference parameter or output parameter is selected from the group comprised of: screen belt wear, particularly screen belt attrition and screen belt clogging and that the input parameters are parameters from the group comprised of: process air volumetric flow rate of the process air suctioned through the screen belt, process air speed of the process air suctioned through the screen belt, screen belt speed, process air temperature, and monomer volumetric flow rate. It lies within the scope of the invention for process air to be suctioned in the fiber or filament delivery area through the mesh conveyor belt by at least one exhaust fan below the mesh conveyor belt. In that case, the process air volumetric flow rate and/or the process air speed of the process air suctioned through the screen belt can be measured and/or determined.

One recommended embodiment of the method according to the invention is characterized in that a plurality of reference parameters, particularly at least two and preferably at least three reference parameters are generated and that a plurality or multiplicity of input parameters are measured from a plurality of output parameters, corresponding to the reference parameters, are determined, and that, in the event of a deviation of at least one determined value of an output parameter from at least one value of the reference parameter, an anomaly of the output parameter or output parameters is signaled. As explained above, the identification of the deviation or anomaly can be followed by a reaction in the form of shutting the entire system down and/or shutting at least one system component down and/or controlling adjustable parameters of the system components.

As was also explained above, it lies within the scope of the invention for the reference parameters or the values of the reference parameters to be measured during reference operation (trouble-free normal operation) of the system. Furthermore, it was already explained that at least one reference parameter can also be predefined as an empirical value. It is thus possible in the context of the invention for all of the reference parameters to be measured during reference operation of the system or for a portion of the reference parameters to be measured during reference operation of the system and for another portion of the reference parameters to be predefined as empirical parameters, or for all of the reference parameters that are used to be predefined as empirical parameters. According to an especially recommended embodiment of the invention, a reference model is determined from a plurality of reference parameters. This reference model is, as it were, a classification model that is determined from the measurement data from reference operation (trouble-free normal operation). A plurality of output parameters are then calculated from a plurality or multiplicity of input parameters and, in turn, an initial model is determined from this. If this initial model deviates from the reference model, an anomaly of the initial model can be identified and/or signaled. This can then be followed by an appropriate reaction as described above.

It lies within the scope of the invention for the evaluating unit for determining at least one output parameter from the input parameters to be at least one computer. The measured values of the input parameters can be transmitted by wired or wireless means to the evaluating unit and/or to the computer.

The individual measuring devices and/or measuring sensors for measuring the input parameters are on system components of the nonwoven fabric-making system according to the invention. It lies within the scope of the invention for the input parameters to be measured continuously or in a substantially continuous manner. One preferred embodiment is characterized in that at least a portion, particularly the majority of the input parameters and, according to a design variant, all of the input parameters are measured continuously and that the at least one output parameter or the initial model is determined therefrom. A sampling period of 0.5 s to 10 min, preferably from 1 s to 1 min, and more preferably from 1 s to 10 s is advantageously used. According to one design variant, a plurality or a multiplicity of measurement data are used in the evaluation of each measured input parameter. The measured value of the input parameter is formed as an average from these measurement data. It is recommended that at least 10 to 20, preferably 10 to 50, and very preferably greater than 100 measurements or data points be detected for determining the measured value of each input parameter.

The compartment pressure, which is preferably used as an output parameter, is advantageously determined as follows: The relevant person skilled in the art first selects the input parameters that are definitive for or have a controlling influence on the compartment pressure to be determined. Over twenty input parameters can be potentially considered for this. However, nine of these input parameters are significant for the level of the compartment pressure, so these nine input parameters are used to determine the output parameter. The compartment pressure is first measured in the trouble-free normal state of the nonwoven fabric-making system, and the measured value or values obtained in this way are used as a reference value of the reference parameter for the evaluation to follow. In addition, at least one set of values or measured values is advantageously determined for the nine input parameters during trouble-free normal operation of the system. These data or measurement data of the input parameters that characterize the normal behavioral model so to speak are preferably stored, particularly in an SQL database, and are thus available at any time. According to a preferred embodiment, approximately 580,000 data points with a sampling period of 1 s are detected during trouble-free normal operation for the nine input parameters in relation to trouble-free normal operation and for the reference parameter (this corresponds to about 161 hours of manufacture).

After the above-described data acquisition and data validation, a modeling process is advantageously followed. In order to keep its complexity as low and the interpretability as high as possible, the modeling is generally carried out using the simplest modeling processes. For instance, linear regression with the gradient method can be used in the present case. Preferably, the model is set up in analytical form (mathematical equation), and with regard to the embodiment of compartment pressure, seven of the nine input parameters (variables) can be selected as linear terms and two as quadratic terms. The parameters of the equation, i.e. the multiplication coefficients of the input variables and an additive constant, are then estimated using the gradient method. Care should be taken to ensure that the embodiment of the nonwoven fabric-making system influences the coefficients, so the coefficients are advantageously determined for each nonwoven fabric-making system in order to achieve greater accuracy.

The model is then validated, with k-fold cross validation being advantageously selected as for validation, and k is advantageously set to 10. Two quality criteria should be observed here: The mean absolute error meanAE and the mean relative error meanRE are both calculated as the average of 10 subsets of the k-fold cross validation. The accuracy of the model is described using the confidence interval. The results with the 95% confidence intervals are:
meanAE=49.0132±0.0774 Pa
meanRE=1.6356%±0.0031%.

This evaluation merely represents one preferred variant of the invention.

To attain the objects, the invention also teaches a nonwoven fabric-making system for making a nonwoven fabric from fibers, preferably for making a spun-bond nonwoven fabric from continuous filaments or for making a melt-blown nonwoven fabric from continuous filaments, where at least one spinneret is provided for spinning the fibers or continuous filaments, at least one cooler for cooling the spun fibers or continuous filaments is optionally also present, at least one stretcher for stretching the fibers or continuous filaments is preferably downstream from the cooler, and at least one conveyor, particularly a mesh conveyor belt for delivering the fibers or filaments to the nonwoven web, is present.

Furthermore, at least one measuring device, particularly at least one sensor for measuring input parameters is provided, the at least one measuring device and/or the at least one measuring sensor is near the spinneret and/or at the cooler and/or at the stretcher and/or at at least one diffuser and/or at the conveyor, and at least one evaluating unit is also present that is set up such that at least one output parameter can be determined from the measured input parameters. According to a preferred embodiment of the invention, the determined output parameter is compared with the reference or with one of reference parameters that is generated. According to a recommended embodiment, at least one alarm is provided with which a deviation of the output parameter from the reference parameter can be signaled. It lies within the scope of the invention for the evaluating unit to be embodied as a computer. Advantageously, a plurality of measuring devices and/or of measuring sensors are present for measuring the input parameters. The alarm is preferably set up as a visual and/or acoustic alarm.

It also lies within the scope of the invention for at least one extruder for feeding a plastic or a plastic melt to the spinneret to be provided. Advantageously, at least one cleaning screen and/or at least one melt pump is between extruder and spinneret. According to one embodiment of the invention, at least one measuring device and/or at least one measuring sensor is positioned at the extruder and/or at the cleaning screen and/or at the melt pump for measuring an input parameter.

It is recommended that at least one measuring device and/or at least one measuring sensor for measuring an input parameter be provided at the spinneret and/or of the spinning nozzle, preferably in order to measure the melt temperature of the plastic melt as an input parameter. One very especially preferred embodiment of the invention is characterized in that the cooler that is preferably provided has at least one cooling chamber and at least one air-supply compartment for feeding process air and/or cooling air into the cooling chamber and that measuring devices and/or measuring sensors are in the cooling chamber and/or in the air-supply compartment and/or on at least one blower of the air-supply compartment and/or on at least one extraction gap of the monomer extractor and/or on an exhaust fan of the monomer extractor. Preferably, at least one temperature sensor is a measuring sensor in the cooling chamber and/or in the air-supply compartment, with it being possible for the temperature of the process air and/or cooling air to be measured as an input parameter using this temperature sensor and/or measuring sensor. Advantageously, at least one speed sensor is present on at least one blower of the air-supply compartment. This speed sensor is used to measure the blower speed as an input parameter. In principle, a sensor could also be provided on the blower in order to measure the torque of the blower. It is recommended that at least one measuring sensor for measuring or determining the volumetric flow rate of the gas being suctioned through the extraction gap be positioned at at least one extraction gap of the monomer extractor. Using the at least one measuring sensor that is provided at the monomer extractor, the flow cross section of the monomer extractor can also be determined. In particular, according to one embodiment, the position of a closure element, particularly the position of a closure cap for the extraction gap, more particularly for the extraction gap of the monomer extractor, can be measured or determined. The monomer volumetric flow rate can then be calculated from this. One recommended embodiment is further characterized in that at least one measuring sensor is provided at the outlet gap of the stretching passage, with it being preferably possible to measure or determine the outlet gap width of the stretching passage using this measuring sensor. It is also recommended that at least one measuring sensor, preferably at least two measuring sensors be positioned at the diffusers, particularly for measuring or determining the positions of the two diffuser walls of a diffuser, which is preferably provided below the stretcher. It lies within the scope of the invention for the diffuser, more particularly the diffuser walls to diverge from the stretcher toward the conveyor, thereby establishing an opening angle between the diffuser walls. It is thus possible to determine the position of the diffuser walls and hence also the opening angle of the diffuser using the at least one measuring sensor or with the two measuring sensors that are preferably provided at the diffuser.

One especially preferred embodiment of the nonwoven fabric-making system according to the invention is characterized in that an assembly, more particularly an assembly of the cooler and the stretcher, is a closed assembly. Here, "closed assembly" means in particular that, apart from the process air and/or cooling air that is introduced in the cooler, no additional air is supplied to the assembly from the cooler and stretcher. The preferably closed assembly has proven to be very especially advantageous in the context of the method according to the invention and produces especially precise and reproducible results.

The invention is based on the discovery that the inventive method and the inventive system offer a simple and cost-effective possibility for establishing and indicating, in a functionally reliable and precise manner, a fault condition or anomaly in a nonwoven fabric-making system. In order to implement these measures, only relatively simple, non-complex, and cost-effective system components are required. Through the implementation of the measurements and evaluations according to the invention, the operation of the system and/or the operation of system components can be adjusted in a timely manner in order to prevent disadvantageous, serious damage to the system that would result in extended down time. Fault conditions or anomalies in the system or during the execution of the method can be indicated or signaled in a quick, clear, precise, and simple manner. By virtue of the clear and quick identification of deviations between reference parameters and output parameters, system components can be controlled with or without feedback in a targeted manner as needed in order to counteract the deviations or anomalies and restore the normal state. The measures according to the invention are characterized overall by low complexity and low costs.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
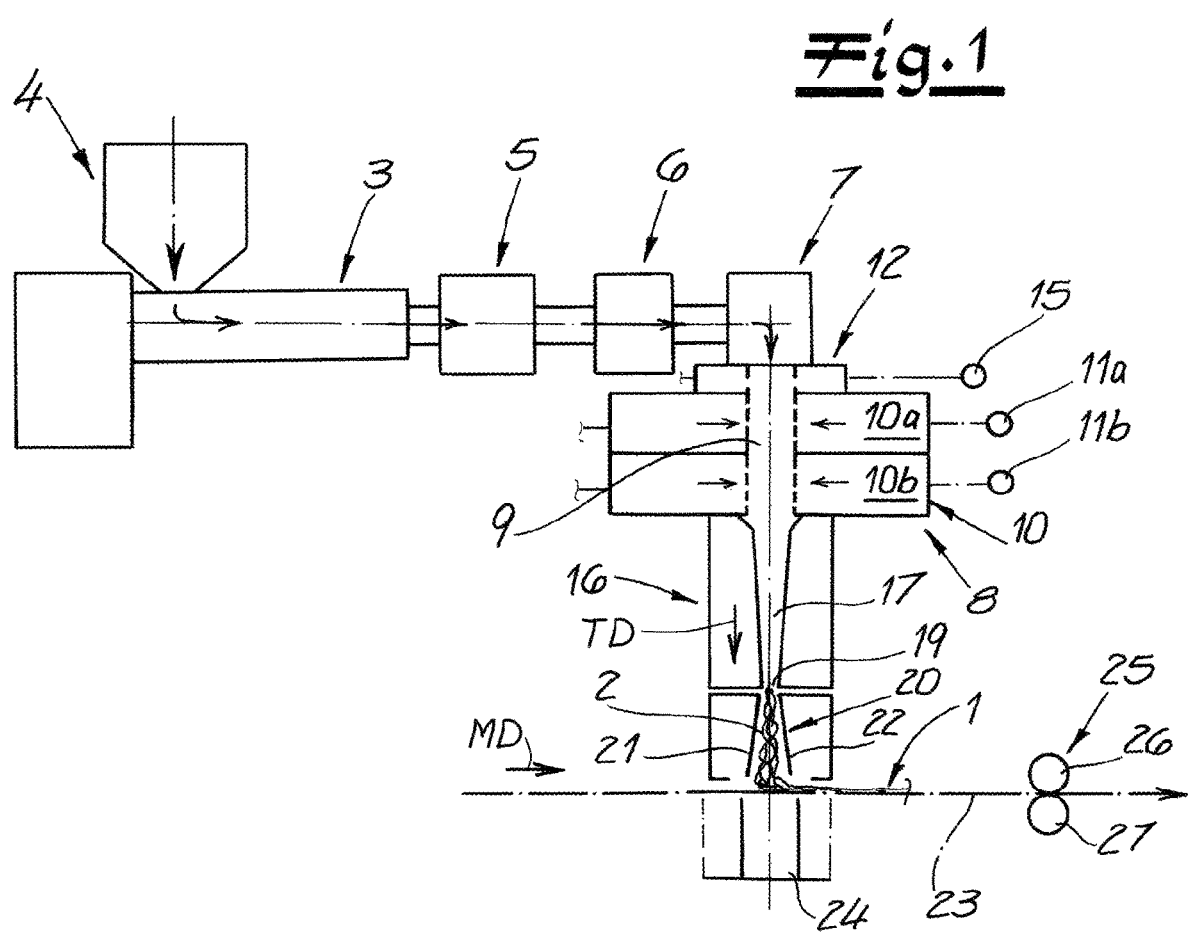
FIG. 1 is a vertical section through a system for making a spun-bond nonwoven fabric.
Figure 2:
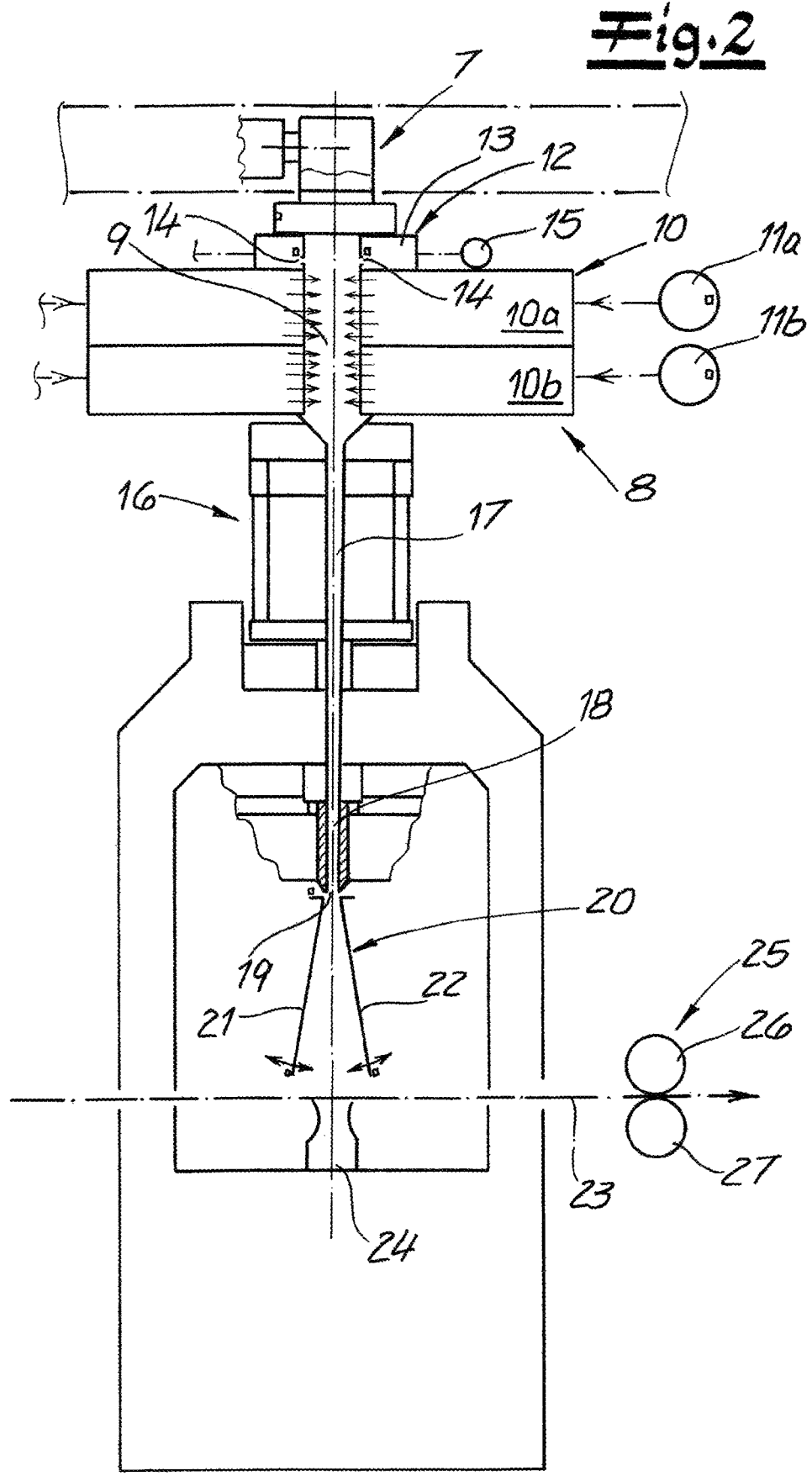
FIG. 2 is an enlarged section from FIG. 1.

As seen in FIGS. 1 and 2, a system according to the invention makes a spun-bond nonwoven fabric. Using this system, continuous filaments 2 are spun according to the spun-bond process and made into a spun-laid nonwoven or spun-bond nonwoven fabric 1. The continuous filaments 2 are advantageously made of thermoplastic plastic, and the plastic or the plastic melt is preferably, and here, fed from an extruder 3 to a spinning device 7 in the form of a spinneret. To achieve this, the plastic is preferably introduced into the extruder 3 in the form of plastic granulate via a supply hopper 4. From the extruder 3, the plastic melt is fed through a filter in the form of a cleaning screen 5 and conveyed by a melt pump 6 to the spinneret 7. The continuous filaments 2 are spun by this spinneret 7 and, subsequently, and in this embodiment, fed through a cooler 8. The cooler 8 advantageously has a cooling chamber 9 as well as an air-supply chamber 10 that is provided next to the cooling chamber 6. Preferably, and here, the air-supply compartment 10 is subdivided into an upper compartment 10a and a lower compartment 10b. Process and/or cooling air of different temperatures can be preferably fed in from the two compartments 10a and 10b. Advantageously, blowers 11a and 11b for feeding in the process air are connected to the compartments 10a and 10b of the air-supply compartment 10. The two blowers 11a and 11b can be preferably operated independently of one another at respective blower speeds $n_a$ or $n_b$ and with a blower torques $I_a$ or $I_b$. Here, process air having a process air temperature $T_a$ is fed from the upper compartment 10a of the air-supply compartment 10, and process air having a process air temperature $T_b$ is fed via the lower compartment 10b of the air-supply compartment 10, with the two temperatures $T_a$ and $T_b$ preferably being different. According to a preferred embodiment of the invention, the blower speeds $n_a$ and $n_b$ as well as the process air temperatures $T_a$ and $T_b$ are measured as input parameters in order to determine the compartment pressure as an output parameter. This will be explained in further detail below.

According to an especially preferred embodiment, a monomer extractor 12 is provided between the spinneret 7 and the cooler 8. In this monomer extractor 12, objectionable gases that occur during the spinning process are removed or extracted from the system, more particularly from the filament-forming region. Preferably and here, the monomer extractor 12 has at least one extraction chamber 13 with two diametrally opposite extraction gaps 14. Furthermore, the monomer extractor 12, more particularly the extraction chamber 14, is equipped with an exhaust fan 15. When the compartment pressure is an output parameter, the flow cross section of the extraction gap 14 is preferably used. The flow cross section of the monomer extractor, more particularly of the extraction gap 14, is advantageously adjusted by at least one closure element, particularly by a closure cap (not shown in the figures). The position of this closure element or closure cap can be measured as an input parameter. According to one design variant of the invention, the extracted monomer volumetric flow rate $V_M$ of the gases extracted in the monomer extractor can be determined and optionally used as an input parameter. In principle, the blower speed $n_M$ of the exhaust fan 15 of the monomer extractor could also be accounted for in the determination of an output parameter, particularly in the determination of the compartment pressure as an output parameter. Preferably, however, the position of the closure cap (not shown) on the extraction gap 14 or extraction gaps 1 is used as an input parameter for determining the compartment pressure as an output parameter.

The continuous filaments 2 are advantageously introduced from the cooling chamber 9 into a stretcher 16 that preferably has an intermediate passage 17 and a stretching passage 18 connected thereto. Preferably and here, the intermediate passage 17 converges in the direction of filament flow. According to a very recommended embodiment, and here, the assembly of the cooler 8 and the stretcher 16 is closed, and no additional air is supplied from the outside other than the process and/or cooling air that is fed into the cooling chamber 9. At its lower end, the stretching passage 18 has the outlet gap 19 through which the continuous filaments 2 and the process air exit the stretcher 16. The outlet gap width $a_w$ of the stretching passage 18 (width of the outlet gap 19 in the machine direction MD or in the travel direction of the spun-bond nonwoven web) is preferably measured and used as an input parameter when, according to a preferred embodiment, the compartment pressure is to be determined as an output parameter. This, too, will be explained in further detail below.

The continuous filaments 2 exiting the stretching passage 18 are then advantageously fed through at least one diffuser 20. In principle, it is also possible for two diffusers 20 to be provided in succession or one below the other in the downward direction of filament travel. The diffuser 20 provided here has diffuser walls 21, 22 that diverge downward. According to a recommended embodiment of the invention, the positions $d_a$ and $d_b$ of the diffuser walls 21, 22 are detected or measured and used as an input parameter in the calculation of the output parameter, particularly if, according to a preferred embodiment, the compartment pressure is the output parameter to be determined.

The continuous filaments 2 emerging from the diffuser 20 are then preferably delivered as a nonwoven web to a conveyor that is a mesh conveyor belt 23. It is recommended that at least one exhaust fan 24 provided below the mesh conveyor belt 23 be used to suction process air through the mesh conveyor belt 23 in the area where the continuous filaments are deposited. The nonwoven web deposited onto the conveyor or a mesh conveyor belt 23 is preferably compacted. Advantageously, and here, this compaction is done by a calender 25 that has two reciprocating calender rolls 26, 27. At least one of these calender rolls 26 and 27 is advantageously heated. The compaction in the calender 25 can be performed as a precompaction of the nonwoven web, and final compaction, in the form of water-jet condensation or the like, for example, can be performed subsequently to this precompaction. The nonwoven web or the spun-bond nonwoven fabric 1 produced in this way is then advantageously wound into a roll by a coiler (not shown in the figures).

Figure 3:
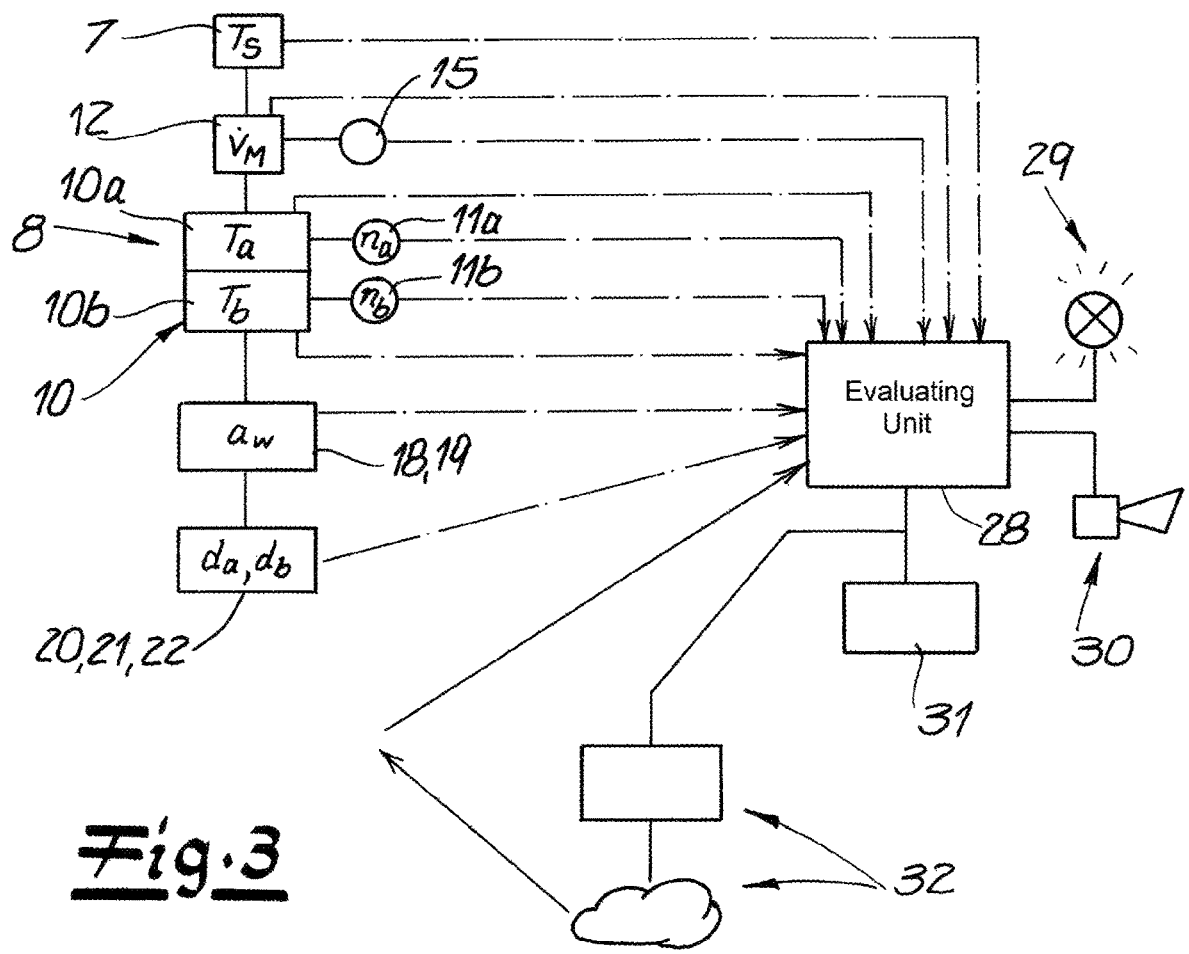
FIG. 3 is a schematic process diagram for the execution of the method according to the invention.

FIG. 3 schematically illustrates the method according to the invention for determining an output parameter. Here, the same system components are provided with the same reference numbers as in FIGS. 1 and 2. In this embodiment, the compartment pressure in the air-supply compartment 10 is to be determined as an output parameter. According to a preferred embodiment of the invention, a compartment pressure $p_k$ during reference operation or during trouble-free normal operation of the system according to the invention is first measured. A pressure sensor may be provided as a reference measuring device in the upper compartment 10a of the air-supply compartment 10. The compartment pressure $p_k$ measured using this pressure sensor during trouble-free normal operation is used as the basis for the subsequent evaluation as a reference parameter. Subsequently, a compartment pressure $p_k$ is determined as an output parameter with the aid of a total of nine input parameters, and this compartment pressure $p_k$ that was determined as an output parameter is compared with the reference value of the compartment pressure $p_k$.

As a first input parameter, the melt temperature $T_S$ of the plastic melt at the spinneret 7 is measured. The nozzle temperature of the spinneret 7 can also be measured here as an alternative. For this purpose, a temperature sensor is advantageously present as a measuring device or sensor at the spinneret 7 or at the spinning nozzle. It will readily be understood that, for the measurements described in the following, analogous measuring devices and/or measuring sensors for measuring the input parameters at analogous positions can also be used. Moreover, the monomer volumetric flow rate $V_M$ is used in the determination of the output parameter. For this purpose, the position of the closure cap or closure caps on the extraction gap 14 or extraction gaps 14 are measured or detected on the monomer extractor 12, in which the monomer volumetric flow $V_M$ is extracted. This position n of the closure cap can be used directly in the determination of the output parameter, or the monomer volumetric flow rate $V_M$ is calculated from the position n of the closure cap and used in the determination of the output parameter. Two input parameters (melt temperature $T_S$ and position of the closure caps or monomer volumetric flow rate $V_M$) are thus already available.

Additional input parameters result from measurements at the air-supply compartment 10. Advantageously and here, process air having the process air temperature $T_a$ is fed into the upper compartment 10a and process air having at a process air temperature $T_b$ is fed into the lower compartment 10b. The two process air temperatures $T_a$ and $T_b$ are preferably measured as input parameters by sensors that are embodied as temperature sensors. Furthermore, two process air streams in the two compartments 10a and 10b are fed in by the two blowers 11a and 11b. The two blowers' speeds $n_a$ and $n_b$ are also measured as input parameters, preferably using suitable measuring sensors, and used in the determination of the output parameter. Measurements in the air-supply compartment 10 generate four additional input parameters for the determination of the output parameter.

The outlet gap width $a_w$ of the outlet gap 19 at the lower end of the stretching passage 18 constitutes an additional input parameter that can be either measured or predefined as a fixed system parameter. Furthermore, the positions $d_a$ and $d_b$ of the two divergent diffuser walls 21 and 22 of the diffuser 20 constitute input parameters that are used to determine the output parameter (compartment pressure). These two input parameters $d_a$ and $d_b$ are either measured or detected or likewise predefined as fixed system parameters.

According to a recommended embodiment of the invention, all nine input parameters $T_S$, $V_M$, Ta, Tb, $n_a$, $n_b$, $a_w$, $d_a$ and $d_b$ are fed to a computer that is an evaluating unit 28. Here, the compartment pressure $p_k$ is determined or calculated as an output parameter from the nine input parameters, and the value of this output parameter is advantageously compared with the value for compartment pressure measured as a reference parameter. It is recommended that the above-described measurements or determinations of the input parameters, the determination of the output parameter from these input parameters, and the comparison of the value of the output parameter with the value of the reference parameter be performed on an ongoing basis during operation of the system. In this way, the evaluating unit 28 can be used to identify a discrepancy between the pressure values of output parameter and reference parameter, and a noteworthy anomaly that is occurring is preferably signaled. It lies within the scope of the invention for the signaling to be performed by a visual alarm 29 and/or by an acoustic alarm 30. Alternatively or in addition, the signaling of an anomaly can be mediated via an HMI 31 (Human Machine Interface) and/or through a cloud link 32 (by e-mail, SMS, and the like).

According to a recommended embodiment, the following procedure is employed during the evaluation: One first determines which value set of input parameters, in the preferred embodiment this is a set of nine values for nine input parameters, or which value sets of input parameters fit with the value of the reference parameter measured during trouble-free normal operation. During ongoing operation of the system, the respective value sets of the input parameters that are measured or determined are compared with the value set of input parameters corresponding to the reference value of the reference parameter. Advantageously, if a match or a quasi-match is identified, no alarm is triggered. In contrast, if a deviation or anomaly is identified, this is signaled, more particularly, an appropriate alarm is issued or sent.

The identification and/or signaling of a deviation/anomaly enables an operator of the system to promptly shut the system down as necessary, for example, in order to rid the intermediate passage of filaments that have become stuck therein and to then resume manufacture. This prevents the system from being damaged or extended, unexpected downtime from occurring. In principle, after an anomaly is identified and/or signaled, influence can also be exercised on individual system components through control and/or regulation in order to eliminate the anomaly or deviation.

We claim:

1. A method of making a nonwoven spun-bond or melt-blown fabric, the method comprising the steps of:
   extruding thermoplastic filaments from a spinneret in a travel direction;
   receiving and cooling the spun filaments downstream in the direction from the spinneret with a cooler;
   stretching the cooled filaments downstream in the direction of the cooler with a stretcher;
   depositing the stretched and cooled filaments on a conveyor to form thereon a nonwoven web;
   determining respective different reference parameters for the spinneret, cooler, stretcher, and/or conveyor representing normal trouble-free operation thereof;
   generating respective input parameters different from one another and from the respective different reference parameters with respective sensors at the spinneret, cooler, stretcher, and/or conveyor during operation of the system;
   evaluating the input parameters and generating respective different output parameters representing the evaluation;
   comparing the output parameters with the respective reference parameters and, when the comparison reveals a deviation of at least one of the output parameters from the respective reference parameter, generating an alarm signal;
   feeding a thermoplastic plastic to the spinneret with at least one extruder and feeding molten plastic emerging from the extruder to the spinneret with a melt pump, the reference parameters or output parameters being from the group comprised of: raw material density, bulk density, dosage amount, melt density, feed rate, and melt leakage pertaining to the plastic used, the input parameters being from the group comprised of: melt pressure, extruder temperature, extruder speed, extruder torque, pump speed, and melt temperature; and
   feeding the molten plastic through at least one cleaning screen upstream of the spinneret, at least one of the input parameters being from the group comprised of: melt pressure upstream of the cleaning screen, melt pressure downstream of the cleaning screen, and hours of operation of the cleaning screen.

2. The method defined in claim 1, further comprising the step, when an alarm signal is generated, of:
   recording the alarm signal in an independent memory.

3. The method defined in claim 1, wherein the reference parameters are determined either from input parameters generated during reference operation of the nonwoven fabric-making system or are determined empirically.

4. The method defined in claim 1, wherein at least one input parameter is predefined as a fixed or constant system parameter and used to determine the output parameter, and that the other input parameters are measured.

5. The method defined in claim 1, wherein at least one reference parameter is calculated and used as the basis of the comparison with the output parameter, or that at least one input parameter is calculated and a calculated input parameter is used in the determination of the output parameter.

6. The method defined in claim 1, wherein the evaluation consists in determining a deviation of one of the output parameters from the respective reference parameter and signaling the determined deviation as an anomaly.

7. The method defined in claim 6, further comprising the steps of:
   determining a reference model from the plurality of reference parameters;
   determining an initial model from the plurality of input parameters of the reference model; and, in the event of a deviation of the initial model from the reference model,
   signaling an anomaly of the initial model.

8. The method defined in claim 1, further comprising the step of:
   determining a majority of the input parameters continuously; and
   determining therefrom at least one output parameter with a sampling period of 0.5 s to 10 min.

9. The method defined in claim 1, further comprising the steps of:
   forming with the cooler and stretcher a closed assembly; and
   blocking entry of additional air except process air of the cooling chamber into the closed assembly.

10. A method of making a nonwoven spun-bond or melt-blown fabric, the method comprising the steps of:
    extruding thermoplastic filaments from a spinneret in a travel direction;
    receiving and cooling the spun filaments downstream in the direction from the spinneret with a cooler;
    stretching the cooled filaments downstream in the direction of the cooler with a stretcher;
    depositing the stretched and cooled filaments on a conveyor to form thereon a nonwoven web;
    determining respective different reference parameters for the spinneret, cooler, stretcher, and/or conveyor representing normal trouble-free operation thereof;
    generating respective input parameters different from one another and from the respective reference parameters with respective sensors at the spinneret, cooler, stretcher, and/or conveyor during operation of the system;
    evaluating the input parameters and generating respective different output parameters representing the evaluation;
    comparing the output parameters with the respective reference parameters and, when the comparison reveals a deviation of at least one of the output parameters from the respective reference parameter, generating an alarm signal;
    compacting the nonwoven web with a calender of a compacter, the reference or output parameters being from the group comprised of: firmness of the nonwoven web in a machine direction, firmness of the nonwoven web transverse to the machine direction, stretchability of the nonwoven web in the machine direction, stretchability of the nonwoven web transverse to the machine direction, and nonwoven web thickness, the input parameters being selected from the group comprised of: process air pressure, process air temperature, process air volumetric flow rate, speed of at least one calender roll, calender temperature of at least one calender roll, calender engraving, speed of the mesh conveyor belt, and melt flow index of the plastic used for the filaments; and using a mesh conveyor belt as the conveyor, the reference or output parameters being selected from the group comprised of: screen belt wear, particularly screen belt attrition and screen belt clogging, the input parameters being from the group comprised of: process air volumetric flow rate of the process air suctioned through the screen belt, process air speed of the process air suctioned through the screen belt, screen belt speed, process air temperature, and monomer volumetric flow rate.

11. A method of making a nonwoven spun-bond fabric, the method comprising the steps of:

extruding thermoplastic filaments from a spinneret in a travel direction;

passing the extruded filaments through a cooling chamber;

introducing process air into the cooling chamber from at least one air-supply compartment with a blower and thereby cooling the filaments in the chamber;

extracting monomers between the spinneret and the cooling chamber;

stretching the cooled filaments downstream in the direction of the cooler with a stretcher;

passing the stretched filaments through a diffusor;

receiving the filaments from the diffuser and depositing them on a conveyor to form thereon a nonwoven web;

determining a single reference parameter s for the spinneret, cooler, stretcher, and/or conveyor representing normal trouble-free operation thereof;

selecting input parameters different from one another and from the reference parameter from the group comprising melt temperature, monomer-flow rate, process-air temperature, blower speed, width of a downstream end of the stretcher, and position of walls of the diffuser;

evaluating the input parameters and generating a single output parameter representing the evaluation, the reference parameters or the output parameter being cooling-chamber pressure;

comparing the output parameter with the reference parameter and, when the comparison reveals a deviation of the output parameter from the reference parameter, generating an alarm signal.

* * * * *